Jan. 8, 1935.    O. U. ZERK    1,987,223
SPOKE COVER FOR WHEELS
Original Filed May 27, 1931
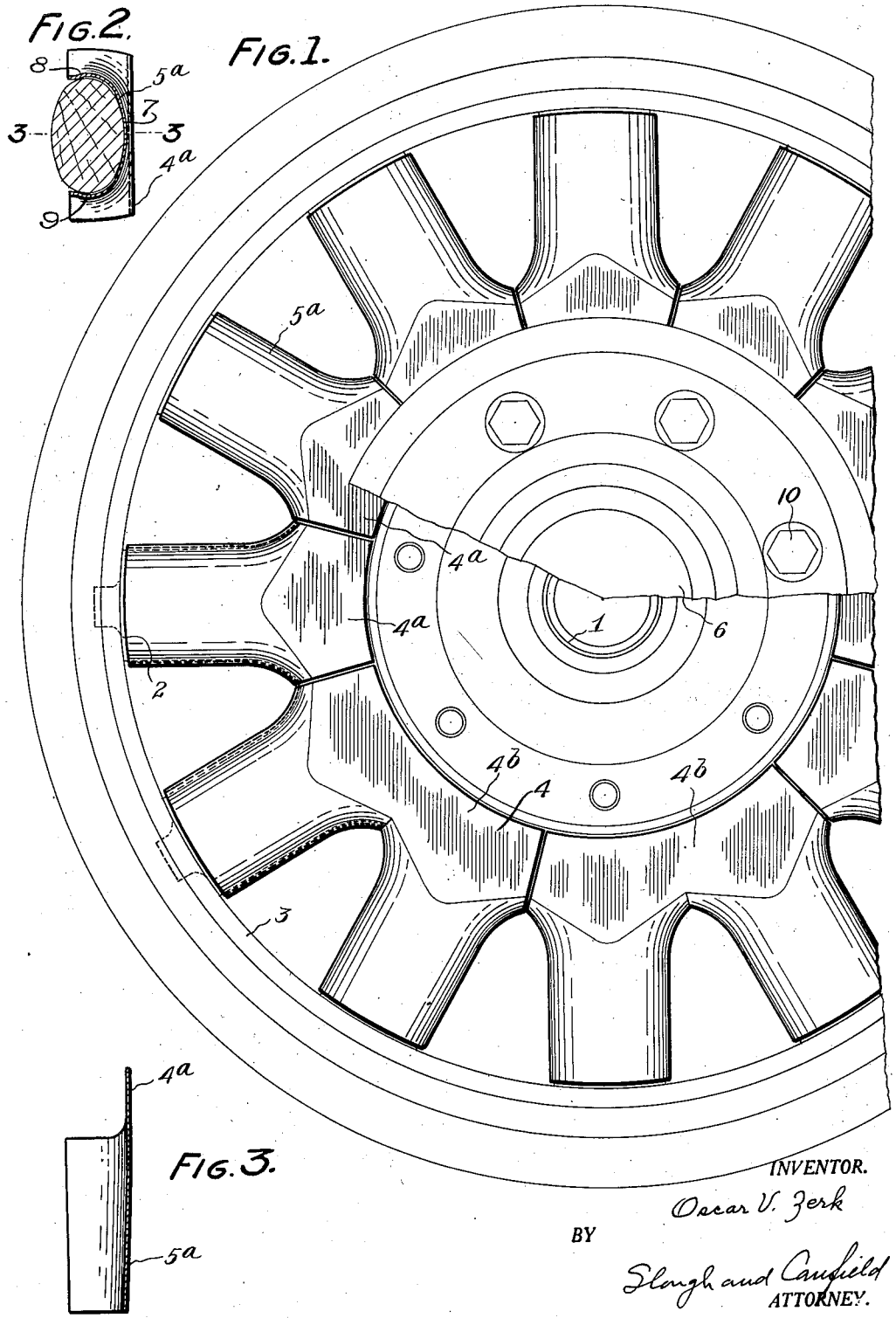
INVENTOR.
Oscar U. Zerk
BY
Slough and Caufield
ATTORNEY.

Patented Jan. 8, 1935

1,987,223

UNITED STATES PATENT OFFICE 1,987,223

SPOKE COVER FOR WHEELS

Oscar U. Zerk, Chicago, Ill.

Application May 27, 1931, Serial No. 540,308
Renewed December 21, 1932

6 Claims. (Cl. 301—37)

My invention relates to metallic covers for wheel spokes, and while particularly adaptable to the covering of wood wheel spokes, it is susceptible of use in connection with other types of wheels such as wire spoke wheels and artillery type wheels made of metal.

The spokes of wooden wheels are exposed to the weather, especially rain, with the result that wooden spokes sometimes get loose, thus losing their rigidity; when wooden spokes are protected by various coats of paint, the rubbing down of these coats to give the spokes a smooth appearance is very expensive, and wooden spokes which are just varnished show the natural color of the wood, which does not harmonize with the other parts of the car where the paint or duco finish represents covered metal.

In other types of spoked wheels, it is very highly desirable to eliminate the expense of giving the spokes a highly finished durable coating before assembly of the wheel, which might be damaged during the assembly processes, and it is very difficult to give these spokes a proper appearing coating after assembly of the wheel. For many other reasons it is very desirable to eliminate plating or painting of the wheel spokes.

An object of my invention is to provide a cover for the spokes of an automotive vehicle wheel, which may be readily applied and maintained in place on the wheel in an improved manner.

Another object of my invention is to provide an improved cover for the spokes of an automotive wheel which is readily attachable and detachable.

Another object of my invention is to provide a cover for the spokes of an automotive wheel which by its inherent resiliency will not be susceptible to such vibrational effects as will create an unpleasant "rattle" by intermittent contact with any part of the wheel.

Another object of my invention is to provide an inherently resilient normally stressed cover making pressure engagement with the parts of a wheel while secured thereto to subdue noise creating vibrations thereof thereagainst.

Another object of my invention is to provide a cover for a plurality of spokes of an automotive vehicle wheel which will be unlikely to entrap water between the opposed spoke and cover surfaces, but which on the contrary will permit the free egress of water therefrom by centrifugal force while the vehicle is in operation, or by gravity when the vehicle is at a standstill.

Another object of my invention is to provide an improved cover for an automotive vehicle spoke, which will cover the base of the spoke as well as the spoke portion, per se.

Another object of my invention is to provide as a separable unit an improved aesthetically beautiful exterior cover for automobile vehicle wheel spokes, applicable thereto in an improved manner, in units adaptable for use on a plurality of spokes.

Another object of my invention is to provide an improved cover means for wheel spokes susceptible to being provided in variant forms as hereinafter set forth, and which is inexpensive in construction and efficient in use while being aesthetically beautiful in appearance.

Other objects of my invention and the invention itself will become more apparent by reference to the following description of certain embodiments of my invention described for the purpose of exemplifying my invention, and which embodiments are illustrated in the accompanying drawing, wherein:—

Fig. 1 is a side elevational view of a fragment of a wheel embodying the principles of my invention and illustrating a plurality of spoke covers applied to different of the spokes thereof by resiliently snapping the covers over the spokes;

Fig. 2 is a transverse section taken through an individual spoke and individual cover therefor of the wheel of Fig. 1;

Fig. 3 is a longitudinal medial section taken through an individual spoke cover as on the line 3—3 of Fig. 2;

Referring to the drawing a wheel is illustrated having a hub 1, wooden spokes 2 carrying at their outer ends a felloe or rim member 3 which may include or have attached thereto a tire securing rim. The wheel illustrated is equipped with the cover provided by my invention and as will be seen in the drawings, the cover is divided upon radial lines intermediate the spokes so that the cover is in effect a plurality of cover elements, and as shown in the upper part of Fig. 1, each of the cover elements consists of a sheet metal member having a spoke surrounding portion 5a and having a flattened portion 4a overlying the mitred centrally disposed part of the wheel spoke. The spoke surrounding portion 5a of each of the cover elements is formed to conform to the cross-sectional shape of the spoke and to snap over and grip the same, as is best illustrated in Fig. 2 of the drawings.

Each of the cover elements is also partially retained in place by the hub cap 6 which is secured to the hub by bolts 10, and the outer margin of which overlies the radially inner flattened portion 4a of each of the cover elements.

The spoke surrounding portions 5a of the cover elements engage the spokes only at three points, 7, 8, and 9, and thereby provide sufficient space between the cover elements and the wheel spokes to allow water, oil, and the like to be expelled either by centrifugal force or by gravity.

In the lower part of Fig. 1, the spoke cover elements are shown as made in pairs by forming a portion 4b substantially as though two of the flattened portions 4a of the form shown in the upper part of Fig. 1 were made integral. These cover elements snap over the wheel spokes in the same manner as do the individual spoke cover elements described above, while the hub cap 6 overlies the inner ends of the spoke covers and helps to retain them in place.

As best illustrated in Fig. 2, the cover portions 5a converge axially inwardly as indicated at 8 and 9 whereby the cover portions 5a resiliently engage the spoke sides axially inwardly beyond the greatest spoke width included in a radial plane.

The cover radially inwardly and adjacent the cover base is relatively widened laterally or flared outwardly to provide a skirt portion conforming generally to the form of the spoke adjacent its base.

From the above it will be seen that I have provided a novel, simple, silent and attractive attachment for vehicle wheels and that the same is susceptible of considerable modification and variation, and I therefore do not limit myself to the embodiments shown and described, but claim as my invention all embodiments coming within the appended claims.

I claim:

1. As an article of manufacture, an ornamental cover for spokes comprising a sheet metal stamping having inwardly converging side flange portions adapted to be forced over a wheel spoke and to press against the outer surface of said spoke beyond the middle portion of greatest diameter, and a longitudinal flat integral projection of said stamping extending therefrom and adapted to fit flat-wise against the flattened base of the associated wheel spoke to cover said spoke base.

2. The combination with an artillery type wheel having a hub and rim, spaced spokes interconnecting the hub and rim, said spokes having laterally flattened bases, and a hub cover for said hub having a peripheral flange portion superposed over at least the inner portions of said spoke bases, of an ornamental cover for each of said spokes, comprising a sheet metal stamping having inwardly converging side flange portions adapted to be forced over a wheel spoke and to press against the outer surface of said spoke beyond the middle portion of greatest diameter, and a longitudinal flat integral projection of said stamping extending therefrom and adapted to fit flat-wise against the flattened base of the associated wheel spoke to cover said spoke base, said extension being clamped between said hub cover flange and the flattened surface of said associated spoke base.

3. As an article of manufacture, an ornamental cover for spokes comprising a sheet metal stamping having inwardly converging side flange portions adapted to be forced over a wheel spoke and to press against the outer surface of said spoke beyond the middle portion of greatest diameter, and a longitudinal flat integral projection of said stamping extending therefrom and adapted to fit flat-wise against the flattened base of the associated wheel spoke to cover said spoke base, said cover comprising at its base portion an outwardly flaring skirt adapted for superpositioning over the correspondingly shaped portion of said spoke adjacent its base.

4. A cover element for a plurality of adjacent wheel spokes less than the total number of spokes, said cover element comprising a sheet metal stamping formed to have a plurality of channels having side flanges formed to cover the side portions of the spokes and to resiliently engage some of said side portions, and the channels having intermediate portions covering the intermediate front portions of the spokes, and the cover having a longitudinal extension formed to overlie the radially inner ends of the spokes.

5. In a cover for the spokes of a wheel, a plurality of cover elements each comprising a sheet metal stamping having a plurality of radially converging channel shaped sections, each of said sections having an outer rounded finished surface and a pair of side flanges with inwardly converging edge portions, the flanges for each of said plurality of channels adapted to resiliently and embracingly engage its associated spoke beyond its middle portion, and common means for detachably securing all of the said cover sections for the same wheel to the front of the wheel, said common means adapted to permit ready detachment of said sections from said wheel front, said common means being entirely accessible from the front of the wheel.

6. In a cover for the spokes of a wheel, a plurality of elements each comprising a sheet metal stamping having a plurality of radially converging channel-shaped sections, each of said sections having an outer rounded finished surface and a pair of inwardly converging side flanges, said cover being maintained on the associated wheel spokes by being snapped over said spokes to resiliently deflect at least some of said flanges to effect a retractive resilient pressure of said flanges against oppositely disposed spoke sides, the channel-shaped sections embracing the spokes throughout substantially the entire radial length of the channel sections, and common means for detachably securing all of said cover sections for the same wheel to the front of the wheel, said common means being adapted to permit ready detachment of said cover sections from said wheel front, and said common means being entirely accessible from the front of the wheel.

OSCAR U. ZERK.